US006931062B2

(12) United States Patent
Zhong (10) Patent No.: US 6,931,062 B2
(45) Date of Patent: Aug. 16, 2005

(54) DECODING SYSTEM AND METHOD FOR PROPER INTERPOLATION FOR MOTION COMPENSATION

(75) Inventor: Zhun Zhong, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 753 days.

(21) Appl. No.: 09/832,610

(22) Filed: Apr. 11, 2001

(65) Prior Publication Data

US 2002/0150159 A1 Oct. 17, 2002

(51) Int. Cl.[7] .............................................. H04N 7/12
(52) U.S. Cl. ................................................ 375/240.12
(58) Field of Search ....................... 375/240.12, 240.16, 375/240.17, 240.24; 348/394.1, 398.1, 402.1, 413.1; H04N 7/12

(56) References Cited

U.S. PATENT DOCUMENTS

| 5,122,875 | A |   | 6/1992 | Raychaudhuri et al. |            |
|-----------|---|---|--------|---------------------|------------|
| 5,227,878 | A | * | 7/1993 | Puri et al. ........ | 375/240.15 |
| 5,262,854 | A |   | 11/1993| Ng                  |            |
| 5,485,279 | A | * | 1/1996 | Yonemitsu et al. .. | 375/240.14 |
| 5,488,419 | A | * | 1/1996 | Hui et al. ........ | 375/240.17 |
| 5,790,174 | A | * | 8/1998 | Richard et al. .... | 725/99     |
| 5,867,208 | A |   | 2/1999 | McLaren             |            |
| 6,704,358 | B1| * | 3/2004 | Li et al. ......... | 375/240.02 |
| 6,748,018 | B2| * | 6/2004 | Sato et al. ....... | 375/240.21 |

FOREIGN PATENT DOCUMENTS

| EP | 0560577 A2 | 9/1993 | ............ H04N/7/13 |
| EP | 0926899 A2 | 6/1999 | ............ H04N/7/50 |

OTHER PUBLICATIONS

Kulanthai Chandrarajh, ■ What is MPEG Video Compression Standard?■ , 1996, pp. 1–11.
Fraunhofer–Gesellschaft, ■ MPEG Audio Layer–3■ , 1999, pp. 4–4.
Fraunhofer–Gesellschaft, ■ Overview of the MPEG=4 Version 1 Standard■ , 1999, pp. 1–2.
D. Thom, H. Purnhage, and the MPEG Audio Subgroup, ■ MPEG Audio FAQ Version 10■ , Feb. 9, 1999, pp. 1–29.
MPEG–2, ■ What is MPEG–2■ , www.crs4.it/luigi/mpeg/mpeg2.html, accessed on Dec. 17, 1999.
Project 04: ■ Hybrid Wavelet–Fractal Codec■ , www.video–software.com/proj04.htm, accessed Mar. 8, 2000.
Fraunhofer, ■ Overview of the MPEG–4 Version 1 Standard■ , www.iis.fhg.de/amm/techinf/mpeg4/index.html, accessed on Jan. 21, 2000.

(Continued)

*Primary Examiner*—Nhon Diep
(74) *Attorney, Agent, or Firm*—Michael E. Belk (57) ABSTRACT

The present invention can complement and benefit virtually any method utilizing motion compensation to decode an inputted digital video data stream by determining a likely local nature of reference frame data area in the video data stream and then applying proper interpolation to the reference frame data area according to the determined likely local nature of the reference frame data area. The present invention can also complement and benefit virtually any decoding system utilizing motion compensation to decode an inputted digital video data stream by providing a motion compensation predictor that is adapted to determine a likely local nature of a reference frame data area in the video data stream and then apply proper interpolation to the reference frame data area according to the determined likely local nature of the reference frame data area.

43 Claims, 5 Drawing Sheets

OTHER PUBLICATIONS

International Ofrainisation for Standardisation, ▌ MPEG Audio FAQ Version 10▌, www.tnt.uni–hannover.de/project/mpeg/audio/faq, accessed on Jan. 21, 2000.

Fraunhofer IIS–A–MPEG–2 AAC, www.iis.fhg.de/amm/techinf/aac/index.html, accessed on Jan. 21, 2000.

Fraunhofer–Gesellschaft, ▌ Video Coding▌, 1999, pp. 1–2.

Delong et al: "Improved Interpolation Motion Estimation, And Compensation For Interlaced Pictures" IEEE Transactions On Image Processing, IEEE Inc. New York, US, vol. 3, No. 5, Sep. 1, 1994, pp. 482–491.

Yanbin et al: "Interlaced Video Coding With Field–Based Multiresolution Representation" Signal Processing. Image Communication, Elsevier Science Publishers, Amsterdam, NL, vol. 5, No. ½, Feb. 1, 1993, pp. 185–198.

* cited by examiner

|  | TYPE 1 | TYPE 2 | TYPE 3 | TYPE 4 | TYPE 5 |
| --- | --- | --- | --- | --- | --- |
| REDUCED RESOLUTION dy = MV mod 1 | 0 | 1/4 | 1/2 | 3/4 | 0*(1) |
| FULL RESOLUTION dy = MV mod 2 | 0 | 1/2 | 1 | 1 1/2 | 0*(2) |

DECODING SYSTEM AND METHOD FOR PROPER INTERPOLATION FOR MOTION COMPENSATION

BACKGROUND OF THE INVENTION

1. Technical Field

This invention relates to a decoding system and method for proper interpolation for motion compensation.

2. Background Art

In some applications, a digital video data stream needs to be displayed at a smaller resolution than it has upon reception. For example, as high definition television (HDTV) is likely to become the digital TV broadcast standard in the U.S., there is a need for low cost decoding systems with High Definition (HD) capacity but Standard Definition (SD)-format output. In a standard MPEG-2 decoding system, for example, three frames of memory are needed for use in decoding the input stream, one for backward reference, one for forward reference, and a third one for the current frame. However, the frame memory size is matched to input resolution, i.e., if input is HD, 3 frames of HD size memory are required to decode the input stream.

An external scaler could be added to such a standard MPEG-2 decoding system to reduce the output resolution. However, the cost for such a system is HD resolution frame memory, HD resolution decoding complexity, and spatial (pixel) domain filtering for down scaling. Alternatively, by downscaling the reference frame just before storage in such a standard MPEG-2 decoding system, memory can be saved by matching memory requirement to the output resolution (SD resolution frame memory can be provided). However, there is no saving regarding computation complexity in this approach, since the decoding loop is still working at full (input) resolution. Furthermore, upscaling would have to be added before motion compensation (motion compensation), which further increases the computation complexity. The downscaling can be moved further forward in the decoding path so that the motion compensation can work in the reduced resolution as well, i.e., no upscaling is needed. Motion vectors, in this case, are needed to be scaled down for the reduced resolution motion compensation. As the motion vectors are scaled down, their precision increase. For a downscaling factor of 2, for example, the motion vectors after scaling are half in magnitude but twice in precision (from ½ pel to ¼ pel.)

Figure 1:
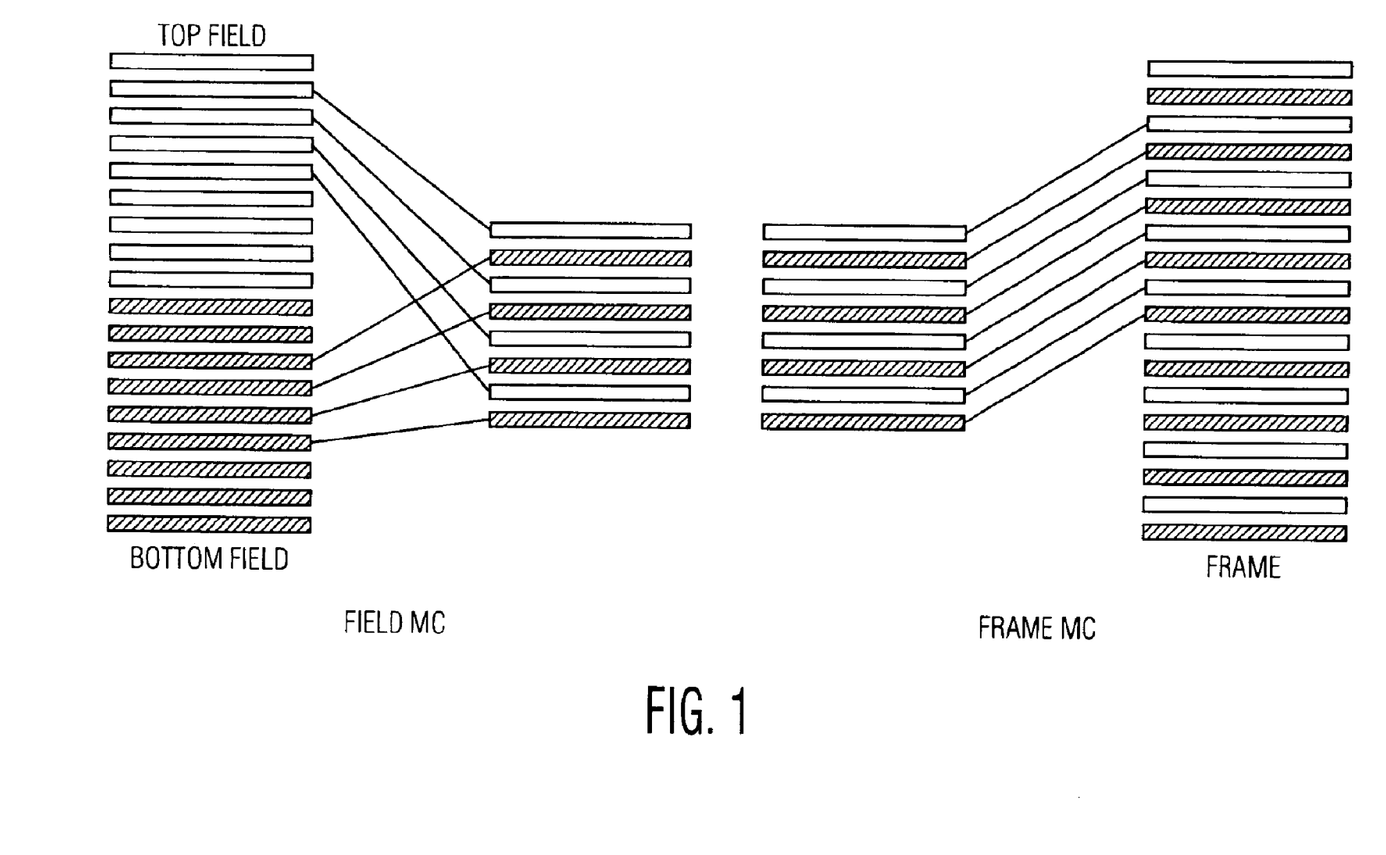
FIG. 1 is an illustration of field and frame motion compensation.

This increase in motion vector precision results in more cases where interpolation is required (i.e., when the motion vector is non-integer). However, the interpolation in the reduced resolution reference frame can cause problems when the frame is interlaced. MPEG-2, for example, supports both field motion compensation and frame motion compensation for interlaced digital video as illustrated in FIG. 1. Referring to FIG. 1, in field motion compensation, data is fetched within separate top and bottom fields and then interlaced to construct a macroblock. It is straightforward to interpolate within a field if field motion compensation is used. In frame motion compensation, however, data is fetched from a frame comprised of a mixture of top and bottom fields to construct a macroblock. Locally, however, the data area to be fetched from the frame might be either stationary/progressive or moving/interlaced. Although generally frame motion compensation is used in progressive data areas and frame-based interpolation applies, it is not always so. Frame motion compensation could be used in interlaced data areas, as long as the encoding process has a good reason to believe this is the best way to estimate the current macroblock. If this is the case, frame-based interpolation can cause the problem of fetching the wrong field, and therefore, interpolation should be done on a field basis for frame motion compensation.

Unfortunately, whenever frame motion compensation is used standard decoding systems cannot determine locally whether the data area to be fetched contains progressive or interlaced data. Furthermore, although there are ways to detect vertical high frequencies, to do such detection in the spatial domain is not trivial in terms of computation, and the presence of vertical high frequencies is neither a sufficient nor a necessary condition for indicating interlacing. That is, not all high vertical frequencies result from interlacing, as there are high vertical frequencies in still areas as well.

Thus, whenever frame motion compensation is used existing decoding systems and methods choose only one mode of interpolation (field-based or frame-based) off line and apply it blindly to the whole picture. Both modes of interpolation, however, can cause problems when blindly applied. Specifically, if the frame-based interpolation is applied, it risks running into the problem of fetching the wrong fields in the interlaced moving area (the visual effect is block artifact). On the other hand, field-based interpolation faces the problem of bluriness and aliasing in the progressive stationary area.

Accordingly, what is needed is intelligent video decoding (including scalable video decoding) for video output (including lower-resolution video output) that can dynamically in real time apply proper interpolation according to the local nature of the data area to be fetched whenever frame motion compensation is used. Also what is needed is a decoding system for such intelligent video decoding that has SD resolution frame memory, SD resolution decoding complexity, and no spatial domain filtering. The present invention can solve the previously mentioned drawbacks of prior decoding systems and methods through various embodiments, including a decoding system and method for proper interpolation for reduced resolution motion compensation.

SUMMARY OF THE INVENTION

The present invention can complement and benefit virtually any method utilizing motion compensation to decode an inputted digital video data stream by determining a likely local nature of reference frame data area in the video data stream and then applying proper interpolation to the reference frame data area according to the determined likely local nature of the reference frame data area. For example, a method for applying proper interpolation for motion compensation to a video data stream according to an embodiment of the present invention can include any of the four following steps. One step can comprise evaluating the video data stream to determine whether the video data stream was encoded using field motion compensation or frame motion compensation. Another step can comprise applying field-based interpolation to the video data stream if the video data stream was encoded using field motion compensation. Still another step can comprise determining a likely local nature of reference frame data area in the video data stream, which can be done by utilizing a vertical component of a decoded motion vector to attempt to determine the likely local nature of the reference frame data area and which can be done dynamically in real time. Yet another step can comprise applying proper interpolation (frame-based interpolation or field-based interpolation) to the reference frame data area according to the determined likely local nature of the reference frame data area, which can be done dynamically in real time as well. These last two possible steps can be conditional on the video data stream being encoded using frame motion compensation. Furthermore, the method can be for applying proper interpolation for reduced resolution motion compensation to a video data stream.

The present invention can also complement and benefit virtually any decoding system utilizing motion compensation to decode an inputted digital video data stream by providing a motion compensation predictor that is adapted to determine a likely local nature of a reference frame data area in the video data stream and then apply proper interpolation to the reference frame data area according to the determined likely local nature of the reference frame data area. For example, a decoding system for applying proper interpolation for reduced resolution motion compensation to a video data stream according to an embodiment of the present invention can include a motion compensation predictor for retrieving reduced resolution reference frame data areas through scaled down motion vectors, although a decoding system of the present invention can also be for applying proper interpolation for motion compensation to a video data stream. The motion compensation predictor can be a dynamic motion compensation predictor, and can be adapted to evaluate the video data stream to determine whether the video data stream was encoded using field motion compensation or frame motion compensation. The motion compensation predictor can also be adapted to then apply field-based interpolation to the video data stream if the video data stream was encoded using field motion compensation. the motion compensation predictor can also be adapted to determine a likely local nature of a reference frame data area in the video data stream, which can be done by the motion compensation predictor utilizing a vertical component of a motion vector to attempt to determine the likely local nature of the reference frame data area and which can be done dynamically in real time. The motion compensation predictor can also be adapted to then apply frame-based interpolation or field-based interpolation to the reference frame data area according to the determined likely local nature of the reference frame data area, which can be done dynamically in real time as well. These last two possible adaptations of the motion compensation predictor can be conditional on the video data stream being encoded using frame motion compensation.

An advantage of the present invention is that it can apply frame-based interpolation or field-based interpolation dynamically in real time according to determined likely local natures of the reference frame data areas. Therefore, the present invention avoids the drawbacks of prior decoding methods and systems that choose only one mode of interpolation (field-based or frame-based) off line and apply it blindly to all frame motion compensation blocks. Specifically, the present invention avoids fetching the wrong field in the interlaced moving area and avoids blurness and aliasing in the progressive stationary area to the maximum extent.

The foregoing and other features and advantages of the invention will be apparent from the following more particular description of embodiments of the invention, as illustrated in the accompanying drawings.

BRIEF DESCRIPTION OF THE DRAWINGS

The embodiments of the present invention will hereinafter be described in conjunction with the appended drawings, where like designations denote like elements, and.

DESCRIPTION OF THE INVENTION

The present invention relates to a decoding system and method for applying proper interpolation for motion compensation to a video data stream, which can embody MPEG technology. Individuals skilled in the art of MPEG technology may wish to proceed to the Detailed Description section of this specification below. However, for those individuals who are new to MPEG technology, the following Overview Section presents many of the basic concepts and terminology useful in understanding embodiments of the present invention and their benefits and advantages.

1. Overview

Individuals who are new to MPEG technology are directed to U.S. Pat. No. 5,122,875, which is incorporated herein by reference, for a more detailed explanation of MPEG-like encoding/decoding processes than the following summary explanation provides. Moving Picture Experts Group (MPEG) is the name of a family of standards used for coding audio-visual information (e.g., movies, video, music) in a digital compressed format. Within the MPEG standards, full motion video image compression is defined both between frames (i.e., interframe compression or temporal compression) and within a given frame (i.e., intraframe compression or spatial compression). Interframe compression is accomplished via a motion compensation (motion compensation) process. Intraframe compression is accomplished by conversion of the digital image from the time domain to the frequency domain using, among other processes, discrete cosine transform (DCT). The major advantage of using MPEG compression techniques compared to other standards is that MPEG files retain enough information to preserve the quality of the original signal and are generally much smaller than files with a similar level of quality created by competing standards.

The MPEG-2 standard covers a wide range of applications, including interlaced digital video (e.g. HDTV). An interlaced digital video data stream (file) can be arranged in successive groups of pictures, each of which includes compressed data from a like number of image frames. Frames are comprised of top and bottom fields that are snapshots in time of a scene. There are three types of encoded/compressed frames, referred to as the intra (I) frame, the predicted (P) frame, and the bi-directional interpolated (B) frame. The I frames contain the video data for the entire frame of video and are typically placed every 12 to 15 frames. I frames provide entry points into the file for random access, and are generally only moderately compressed. P frames only include changes relative to prior I or P frames because P frames are encoded with reference to a prior I frame or P frame, and P frames receive a fairly high amount of compression. B frames include the greatest amount of compression and occur between I and P or P and P or I and I frames because they require both a past and a future reference in order to be decoded. B frames are never used as references for other frames. Thus, both I and P frames can be referred to as reference frames because they are used as references for future P and B frames.

An encoding process divides frames into a grid of 16 by 16 pixel squares called macroblocks. Because frames are comprised of top and bottom fields, macroblocks are comprised of the two fields as well, i.e., macroblocks can be either frame-based encoded (the fields are mixed together) or field-based encoded (the fields are grouped separately). In a typical application, chrominance information is subsampled. For example, in 4:2:0 format, a macroblock is actually comprised of 6 blocks, four of which convey luminance information and two of which convey chrominance information. Each of the four luminance blocks represent an 8 by 8 matrix of pixels or one quarter of the 16 by 16 matrix. Each of the chrominance blocks is an 8 by 8 matrix representing the entire 16 by 16 matrix of pixels. The respective blocks contain DCT coefficients generated from respective matrices of pixel data. One DCT coefficient conveys DC or average brightness information, and each of the remaining DCT coefficients convey information related to different image spatial frequency spectra. For instance, I frame DCT coefficients represent image data and P and B frame DCT coefficients represent frame difference data. The DCT coefficients are arranged in a particular order with the DCT coefficient conveying DC first and the remaining DCT coefficients in order of spectral importance. Each macroblock includes a header containing information about the particular picture piece as well as its placement in the next larger piece of the overall picture followed by motion vectors (motion vectors) and coded DCT coefficients. Much of the data, including DCT coefficients and header data, is variable length coded. In addition some of the data, such as the DCT coefficient conveying DC and motion vectors, are differential pulse code modulation (DCPM) coded.

The respective frames are divided into macroblocks by an encoding process in order for motion compensation based interpolation/prediction to subsequently be performed by a decoding system. Since frames are closely related, it is assumed that a current frame can be modeled as a translation of the frame at the previous time. Therefore, it is possible then to "predict" the data of one frame based on the data of a previous frame. In P frames, each macroblock is predicted from a macroblock of a previously encoded I or P frame (reference frame). However, the macroblocks in the two frames may not correspond to the same spatial location. In generating an motion compensation prediction from an immediately preceding I or P frame, motion vectors are generated which describe the displacement of the best match macroblocks of the previous I or P frame to the cosited macroblocks of the current P frame. A P frame is then created using the motion vectors and the video information from the prior I or P frame. The newly created P frame is then subtracted from the current frame and the differences (on a pixel basis) are termed residues. Motion compensation based prediction and interpolation for B frames is similar to that of P frames except that for each B frame, motion vectors are generated relative to a successive I or P frame and a prior I or P frame. These motion vectors are analyzed for the best match and the P frame is generated from the motion vector indicated to more accurately predict an image area, or from a weighted average of predicted images using both the forward and backward motion vectors.

In terms of circuitry of a decoding system arranged to decompress an interlaced digital video data stream, generally, the digital video data stream can be applied to a variable length decoder (VLD), wherein the VLD extracts data from the digital video data stream. The VLD is capable of performing variable length decoding, inverse run length decoding, and inverse DPCM coding as appropriate. Decoded DCT coefficients from the VLD can be applied to an inverse DCT (IDCT) circuit which includes circuitry to inverse quantize the respective DCT coefficients and to convert the coefficients to a matrix of pixel data. The pixel data can then be coupled to one input of an adder. Decoded motion vectors from the VLD can be applied to the motion compensation predictor, and in response to motion vectors, the motion compensation predictor can access corresponding blocks of pixels stored in a memory device and apply the same to a second input of the adder. The adder sums up the output of the IDCT and the motion compensation predictor to reconstruct the frame. Once reconstructed, there are two paths for the reconstructed frame: one path directly for output and one path to the memory device that is coupled to the motion compensation predictor.

Specifically, when I frames are being processed, the motion compensation predictor is conditioned to apply zero values to the adder. The IDCT processed data provided by the IDCT device corresponds to blocks of pixel values. These values are passed unaltered by the adder, and are outputted and stored in the memory device as a reference frame for use in predicting subsequent frames. Immediately after an I frame is decoded, a P frame corresponding to a frame occurring a predetermined number of frames after the I frame, is available from the VLD. This P frame was, at the encoder, predicted from the preceding I frame. The DCT coefficients of this P frame thus represent residues, which when added to the pixel values of the decoded I frame, will generate the pixel values for the current P frame. On decoding this P frame, the IDCT device provides decoded residue values to the adder, and the motion compensation predictor, responsive to the motion vectors, accesses the corresponding blocks of pixel values of the I reference frame from the memory device and applies them in appropriate order to the adder. The sums provided by the adder are the pixel values for this P frame. These pixel values are outputted and also stored in the memory device as a reference frame for use in predicting subsequent frames. Subsequent to the decoding of the P frame, B frames, which normally occur intermediate the I and P frames, are provided. B frames are decoded similarly to the P frame, but are only outputted and not stored in the memory device.

2. Detailed Description

The present invention can complement and benefit virtually any method utilizing motion compensation to decode an inputted digital video data stream by determining a likely local nature of reference frame data area in the video data stream and then applying proper interpolation to the reference frame data area according to the determined likely local nature of the reference frame data area. The present invention can also complement and benefit virtually any decoding system utilizing motion compensation to decode an inputted digital video data stream by providing a motion compensation predictor that is adapted to determine a likely local nature of a reference frame data area in the video data stream and then apply proper interpolation to the reference frame data area according to the determined likely local nature of the reference frame data area.

An advantage of the present invention is that it can apply frame-based interpolation or field-based interpolation dynamically in real time according to determined likely local natures of the reference frame data areas. Therefore, the present invention avoids the drawbacks of prior decoding methods and systems that choose only one mode of interpolation (field-based or frame-based) off line and apply it blindly to all frame motion compensation blocks. Specifically, the present invention avoids fetching the wrong field in the interlaced moving area and avoids blurness and aliasing in the progressive stationary area to the maximum extent.

Figure 2:
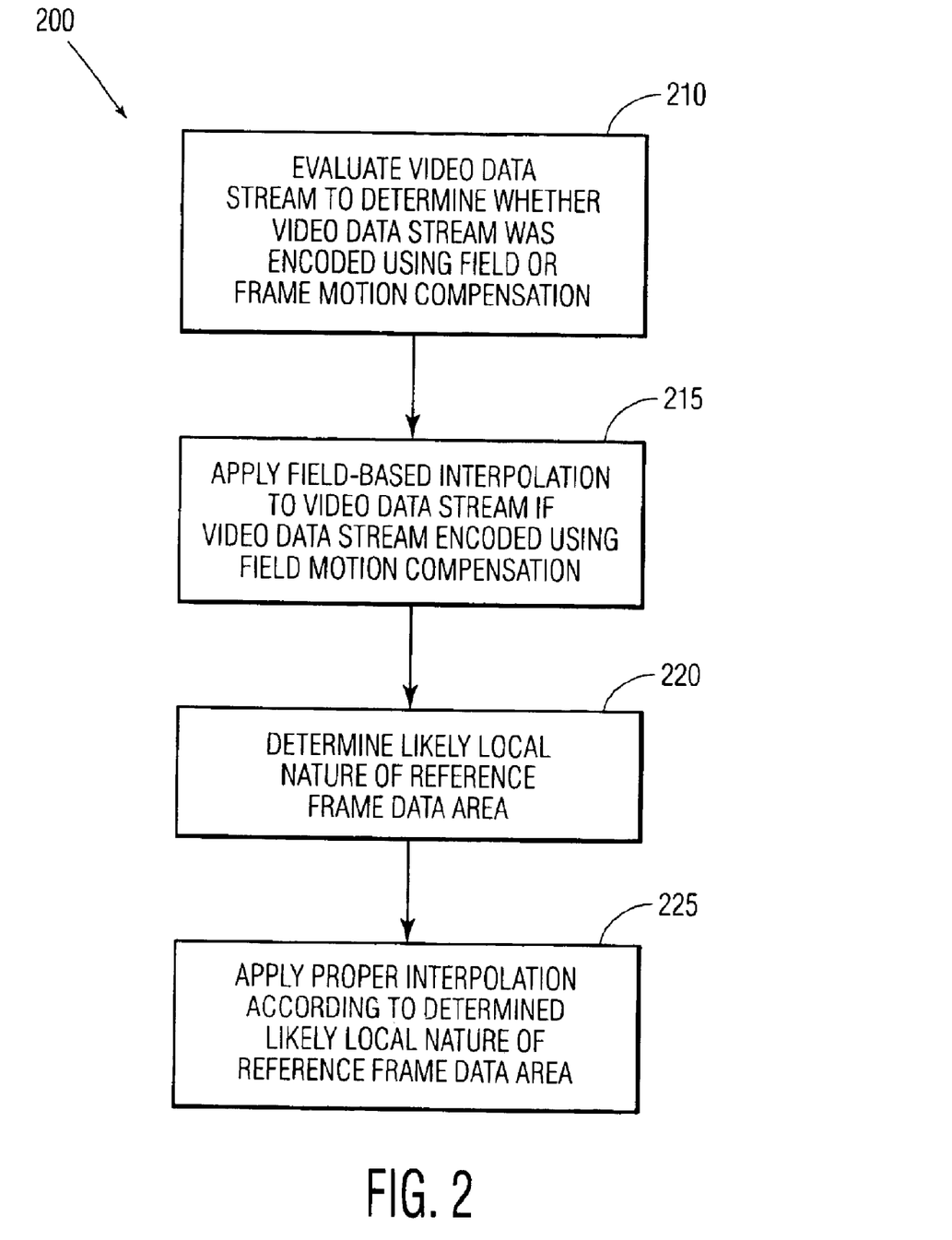
FIG. 2 is a flow diagram depicting a method for proper interpolation for motion compensation according to an embodiment of the present invention.

Referring generally to FIG. 2, a method 200 for applying proper interpolation for motion compensation to a video data stream according to an embodiment of the present invention is depicted and can include any of the four following steps. Step 210 can comprise evaluating the video data stream to determine whether the video data stream was encoded using field motion compensation or frame motion compensation. Step 215 can comprise applying field-based interpolation to the video data stream if the video data stream was encoded using field motion compensation. Step 220 can comprise determining a likely local nature of reference frame data area in the video data stream, which can be done by utilizing a vertical component of a decoded motion vector to attempt to determine the likely local nature of the reference frame data area and which can be done dynamically in real time. Step 225 can comprise applying proper interpolation (frame-based interpolation or field-based interpolation) to the reference frame data area according to the determined likely local nature of the reference frame data area, which can be done dynamically in real time as well. Steps 220 and 225 can be conditional on the video data stream being encoded using frame motion compensation. Furthermore, method 200 can be for applying proper interpolation for reduced resolution motion compensation to a video data stream. More specifically referring to FIG. 2, a method 200 is depicted including the steps 210, 215, 220, and 225, which essentially comprise novel, specialized techniques for applying proper interpolation for motion compensation to a video data stream. Method 200 can also dynamically in real time react to and be applied to an inputted digital video data stream. That is, both field-based interpolation and frame-based interpolation have advantages and disadvantages, and therefore, method 200 can determine dynamically in real time which one will work best for the particular inputted interlaced digital video data stream. Thus, carrying method 200 out dynamically in real time results in better output video quality, as opposed to existing decoding methods that choose only one mode of interpolation (field-based or frame-based) off line and apply it blindly to the whole picture, thereby creating problems such as blurring, aliasing, and a generally degraded picture.

Step 210 of method 200 includes evaluating the video data stream to determine whether the video data stream was encoded using field motion compensation or frame motion compensation, i.e., if the motion compensation fetches data with the top and bottom fields mixed together, or fetches data separately from top and bottom fields. Step 215 comprises applying field-based interpolation to the video data stream if the video data stream was encoded using field motion compensation. If it is determined that the encoding process uses frame motion compensation, a decoding process has the option to use either frame-based or field-based interpolation. Associated with this option, step 210 can also determine whether encoding determined for decoding to fetch reference frame data areas starting from pixel or non-pixel positions for example.

However, existing decoding methods cannot exercise this option, as they are unable to determine locally whether the reference frame data area to fetch contains progressive or interlaced data. Therefore, existing decoding methods are forced to choose one mode of interpolation (field-based or frame-based) off line and are pre-programmed to apply only that mode of interpolation blindly to all the frame motion compensation blocks. Contrary to existing decoding methods, steps 220 and 225 (as more fully described below) can be carried out dynamically in real time.

Step 220 of method 200 includes determining a likely local nature of reference frame data area in the video data stream, whether the reference frame is in reduced resolution or not. Step 220 can also include utilizing a vertical component of a decoded motion vector to attempt to determine the likely local nature of the reference frame data area in the video data stream. As method 200 can be for proper interpolation for reduced resolution motion compensation, step 220 can also comprise utilizing a vertical component of a motion vector to determine a likely local nature of a reduced resolution reference frame data area in the video data stream. A motion vector has two components—a vertical component and horizontal component. Interlacing occurs only in the vertical direction, whereas in the horizontal direction, the pixels in one line are always from the same top or bottom field. Therefore, step 220 can utilize the vertical component of a motion vector because the vertical component of a motion vector can indicate something, if not all, of the local characteristics/nature of a data area (whether it is stationary or moving for example).

Step 225 includes applying proper interpolation (frame-based interpolation or field-based interpolation) to the reference frame data area according to the determined likely local nature of the reference frame data area. As method 200 can be for proper interpolation for reduced resolution motion compensation, step 225 can also comprise applying frame-based interpolation or field-based interpolation to the reduced resolution reference frame data area according to the determined likely local nature of the reduced resolution reference frame data area if the video data stream was encoded using frame motion compensation.

Specifically, an interlaced frame is comprised of top and bottom fields that are a snapshot of the scene at different times. As the encoding process divides frames into macroblocks, macroblocks are comprised of the top and bottom fields, i.e., they can be either frame-based (mixed together) or field-based (separate) encoded. If there is a moving object in the scene, the location of the object in the top field is different than in the bottom field, and the edge of the object will be saw-like in appearance because the locations are different. However, if there is no moving object (a still object in the scene), the interlacing picture becomes the same as a progressive picture because only in a moving area do you see the saw-like appearance of the edge. Therefore, in an interlaced digital video data stream, different parts of the picture have different local characteristics/natures. Thus, because step 220 can utilize the vertical component of a motion vector to indicate the local nature of the data area to be fetched, step 225 can apply the proper mode of interpolation according to the determined likely local natures of the reference frame data areas to be fetched.

For example, if encoding uses frame motion compensation and therefore, decoding has the option to use either frame-based or field-based interpolation, and if it is determined, whether through utilizing the vertical component of a motion vector or not, that the likely local nature of the reference frame data area to be fetched from the interlaced video data stream is likely stationary and not likely to be moving, then step 225 can adaptively determine to apply frame-based interpolation. This dynamic determination by motion compensation avoids applying and developing the problems of blurness and aliasing in the progressive stationary area that would be caused by blindly applying field-based interpolation. Additionally, if it is unable to be reliably determined, whether through utilizing the vertical component of a motion vector or not, that the likely local nature of the reference frame data area to be fetched from the interlaced video data stream is likely stationary and not likely to be moving, then step 225 can adaptively determine to apply field-based interpolation.

Figure 3:
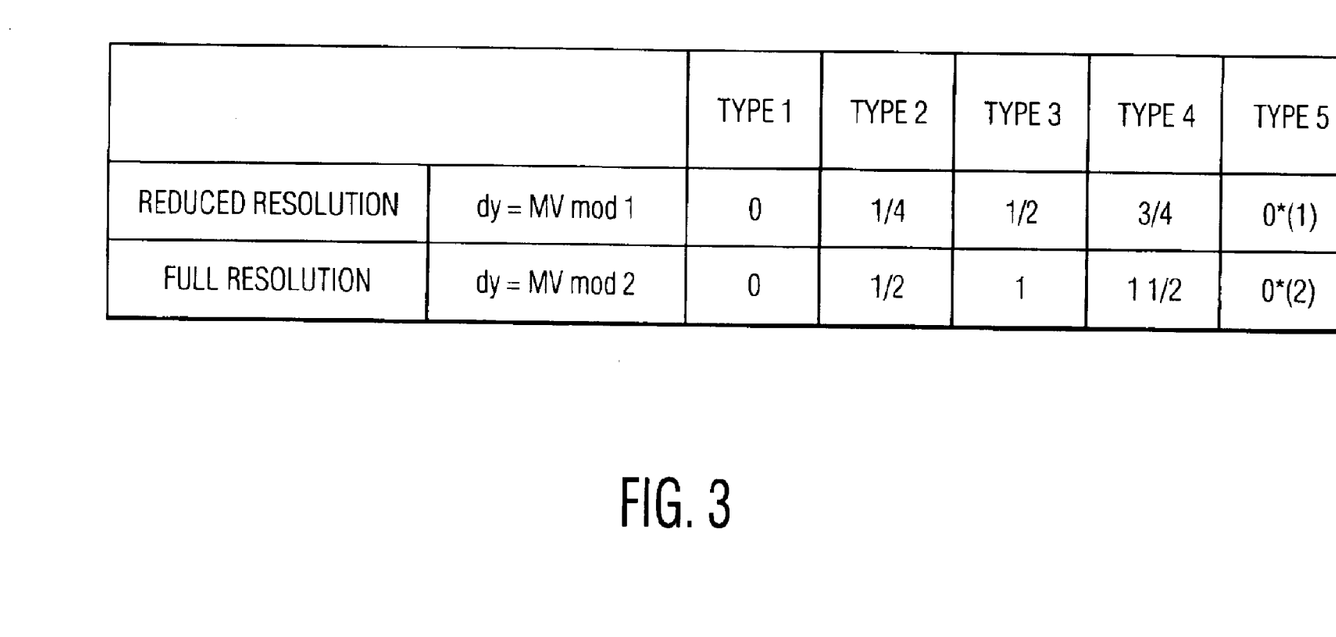
FIG. 3 is an example classification table of motion vector types.

By way of further illustration and explanation, the steps of method 200 can also be described in terms of motion vector type. That is, provided step 210 of method 200 determines that the video data stream was encoded using frame motion compensation, step 220 can include utilizing a vertical component of a motion vector to determine the type of motion vector (i.e., a likely local nature of a reference frame data area), and step 225 can include applying frame-based interpolation or field-based interpolation according to the type of motion vector determined (i.e., the determined likely local nature of the reference frame data area). Thus, in FIG. 3 an example classification table of types of motion vectors in both reduced resolution motion compensation and full resolution motion compensation is depicted. In FIG. 3, motion vectors in reduced resolution motion compensation are classified into 5 types according to their non-integer part. Correspondingly, motion vectors in full resolution motion compensation are classified according to their residual after mod 2. In FIG. 3, motion vectors in reduced resolution motion compensation are half in magnitude but twice in precision compared to motion vectors in full resolution motion compensation. Although FIG. 3 uses a decimation/scaling factor of 2 in the horizontal and vertical dimensions, the invention is not limited to factors of 2. Various decimation factors may be used in the present invention, such as 4 or 8 for example. In terms of the mode of interpolation used for each motion vector represented in FIG. 3, generally, the type of motion vector indicates whether the area is moving or stationary, and from that indication proper interpolation can adaptively be determined and applied.

Figure 4:
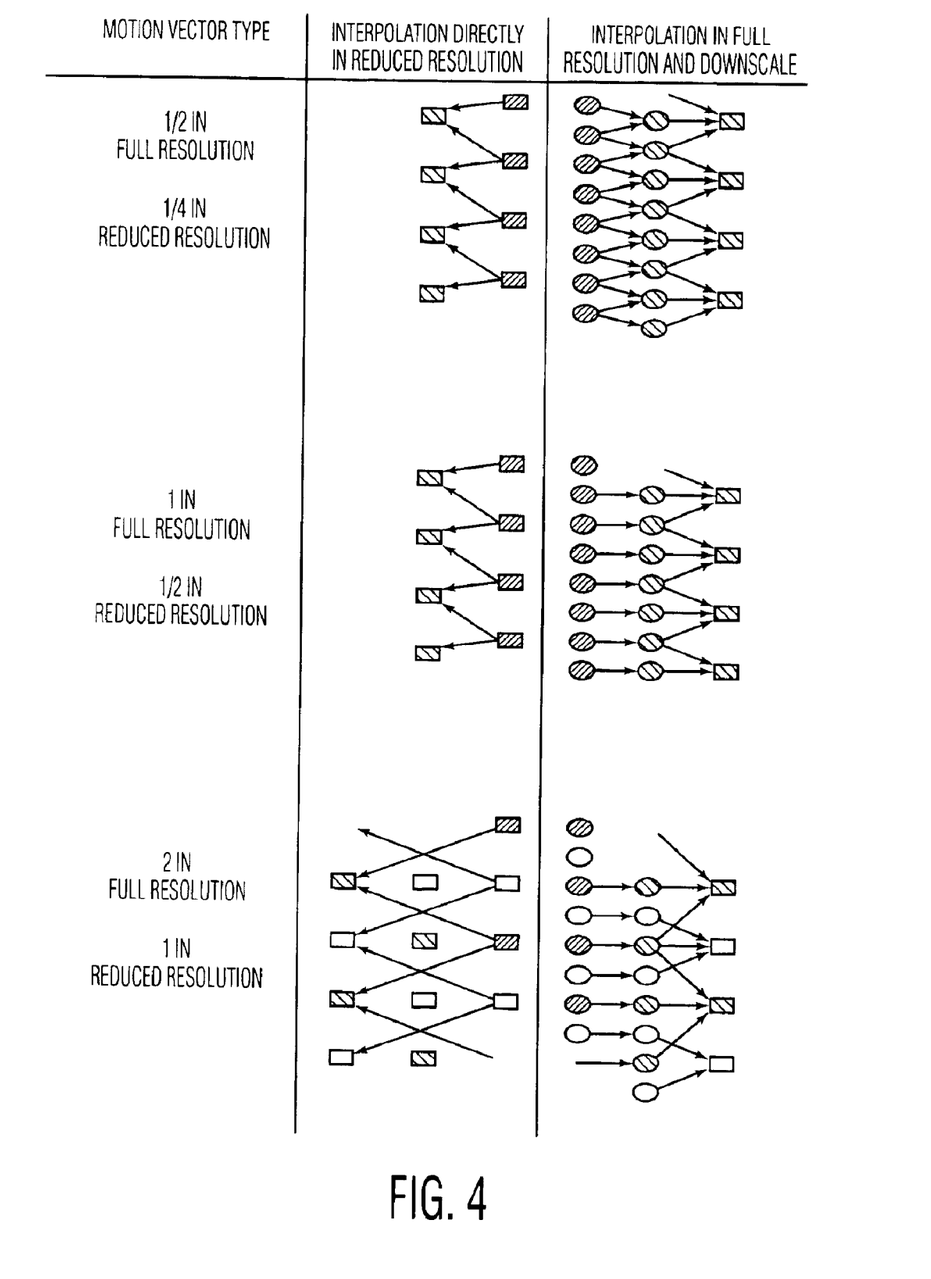
FIG. 4 is an illustration of interpolation used for motion vector types represented in FIG. 3.

FIG. 4 is a comparison illustration of two manners for getting to reduced resolution reference for certain motion vector types of FIG. 3. A first manner of getting to reduced resolution reference is to do the MC (with interpolation) directly on reduced resolution reference frames. If full resolution reference frames are available, then a second manner of getting to reduced resolution reference is to do the full resolution MC (with interpolation) first and then down scale the result to the reduced resolution. This second manner of getting to reduced resolution reference is generally not used because the full resolution reference frame is generally not available. Nevertheless, this second manner of getting to reduced resolution reference is useful as a control: its result should match the final result from doing the MC (with interpolation) directly on reduced resolution reference frames. Specifically in FIG. 4, black ovals represent pixel data in a top field (in a moving area) from full resolution reference, while white ovals represent pixel data in a bottom field (in a moving area) from full resolution reference. Striped ovals represent pixel data fetched (after interpolation if needed) in full resolution. Black rectangles represent pixel data in a top field (in a moving area) from reduced resolution reference, while white rectangles represent pixel data in a top field (in a moving area) from reduced resolution reference. Striped rectangles represent pixel data fetched (after interpolation if needed) in the reduced resolution. Arrows represent interpolation, in that the pixels specific arrows point to are interpolated using the pixels from which the specific arrows originated.

Referring now to FIG. 3 for the definition of dy and FIG. 4 for certain illustrations of motion vector types, for motion vector type 1 dy in full resolution is 0 and dy in reduced resolution is 0 (i.e., motion vector is an even integer after scaling (compare this with type 5 where motion vector is an odd integer after scaling)). Therefore, no interpolation is needed because the motion vector points to an integer/pixel position, and encoding determined for decoding to fetch the reference frame data area starting from that pixel position (interpolation is only needed to get the pixel value on a non-integer position because there is no pixel at such position). In other words, motion vector type 1 points to a reduced resolution area starting from the top field, i.e. with the right field order (top, bottom). However, there is no reliable indication about the local nature of the data area to be fetched (i.e., no reliable determination that the likely local nature of the reference frame data area includes a stationary area). Nevertheless, frame-based interpolation can be applied (although in this case data can be fetched directly) with no harm because the data area will be fetched with the right field order.

Generally for motion vector types 2 through 4, decoding fetches reduced resolution reference frame data areas starting from non-pixel positions (e.g., in type 3, the motion vector is an integer in the full resolution and points to a data area starting from a pixel position, but due to scaling, the pixel position becomes a non-pixel position). Generally for types 2 through 4, the motion vectors in full resolution indicate that the local nature of the area to be fetched is likely stationary, and therefore, frame-based interpolation should be used. Specifically, for motion vector type 2 (dy in full resolution is ½ and dy in reduced resolution is ¼), the motion compensation in full resolution needs interpolation between fields as a stationary area is indicated. In other words, motion vector in full resolution is ½, which indicates that encoding made the decision to ask decoding to fetch the data at the ½-pixel position (i.e., non-pixel position; no data actually there). That means decoding has to do the interpolation/estimation using the neighboring pixels in the vertical direction, and this indicates a good probability that this area is a stationary area because the encoding process wanted the decoding system to do such an interpolation. If a moving area was indicated, it would be less likely that the encoding process would want to do such an interpolation. Therefore frame-based interpolation should be the choice for motion compensation in reduced resolution. For motion vector type 3 (dy in full resolution is 1 and dy in reduced resolution is ½), the motion compensation in full resolution fetches data with reversed field order. This area is not likely to be interlaced. Otherwise, the wrong field will cause a big difference and thus cannot be a good estimation of the current macroblock. Again, frame-based interpolation should be used for motion compensation in reduced resolution. For motion vector type 4 (dy in full resolution is 1 ½ and dy in reduced resolution is ¾), as described for type 2 motion vector above, the motion compensation in full resolution needs interpolation between fields as a stationary/progressive area is indicated. Therefore frame-based interpolation should be the choice for motion compensation in reduced resolution.

The problematic case in FIG. 3 and again illustrated in FIG. 4 is for motion vector type 5 where dy in full resolution is 2 and dy in reduced resolution is 1 (i.e., motion vector is an odd integer after scaling (compare with type 1 where motion vector is an even integer after scaling)). Motion compensation in full resolution fetches data with original field order, whereas the motion compensation in reduced resolution fetches data with reversed field order—motion vector type 5 points to an area starting from the bottom field, i.e., with the reversed field order (bottom, top). In this case, the motion vector in full resolution tells nothing about the local nature of the area to be fetched—it doesn't indicate a stationary area or the indication is not reliable. Applying frame-based interpolation in this case will do harm, as it is dangerous to fetch data with reversed field order in the reduced resolution since the area might be moving/interlaced. To play on the safe side, field-based interpolation should be used to get data with the right field order. In other words, although the motion vector points to an integer pixel position, and this normally indicates no interpolation is needed, the pixel data/value pointed to by the motion vector should not be fetched and used, because by fetching the data pointed to by the motion vector with a vertical component of 1, then data will be fetched starting from the bottom field (i.e., data with reversed field order). Instead for this particular situation, interpolation should be done in each field to get the pixel value corresponding to the integer position in the other field. Though this scheme is not good for a stationary/progressive area (i.e., it would be better to do frame-based motion compensation and fetch the data without any interpolation because interpolation always distorts data and there is loss of data information whenever interpolation is applied), it is a simple way to at least guarantee good processing for moving/interlaced areas.

Thus, according to FIGS. 3 and 4, because the present invention can utilize the vertical component of a motion vector to determine the type of motion vector (i.e., the likely local nature of the data area), interpolation for motion vector types 1 through 4 is not blindly applied. However, in existing decoding methods and systems, interpolation is often blindly applied off line for every type of motion vector, thereby resulting in either blackness (if frame-based interpolation is applied) or blurness and aliasing (if field-based interpolation is applied).

Method 200 and any other method of the present invention can be employed by virtually any decoding system, MPEG (e.g. MPEG-2) or otherwise, that needs motion compensation or reduced resolution motion compensation to retrieve reference frame data areas and/or motion vectors or scaled down motion vectors for fetching the data areas. Thus, the present invention complements and benefits virtually any decoding system that applies interpolation for motion compensation or reduced resolution motion compensation to decode an inputted digital video data stream.

Generally, the present invention comprises a novel, specialized decoding system for applying proper interpolation for motion compensation or reduced resolution motion compensation to a video data stream. The decoding system of the present invention enhances motion compensation by providing a motion compensation predictor that is adapted to determine a likely local nature of a reference frame data area in the video data stream and then apply proper interpolation to the reference frame data area according to the determined likely local nature of the reference frame data area. Furthermore, the motion compensation predictor can adapt on line to an inputted digital video data stream and dynamically in real time determine and apply the mode of interpolation (field-based interpolation and frame-based interpolation) that will work best for the particular inputted digital video data stream. This results in better output video quality, as opposed to existing decoding systems that choose only one mode of interpolation (e.g. field-based or frame-based) off line and apply it blindly to the whole picture, thereby creating problems such as blurring, aliasing, and a generally degraded picture.

Such a motion compensation predictor of a decoding system of the present invention can be adapted to evaluate the video data stream to determine whether the video data stream was encoded using field motion compensation or frame motion compensation, i.e., if motion compensation fetches data with the top and bottom fields mixed together, or fetches data separately from top and bottom fields. If the video data stream was encoded using field motion compensation, the motion compensation predictor can be adapted to apply field-based interpolation to the video data stream. If the motion compensation predictor determines that encoding used frame motion compensation, it has the option to apply either frame-based or field-based interpolation. Associated with this option, the motion compensation predictor can also be adapted determine whether encoding determined for it to fetch reference frame data areas starting from pixel or non-pixel positions for example. However, existing decoding systems cannot exercise this option, as they are unable to determine locally whether the reference frame data area to fetch contains stationary or moving data. Therefore, existing decoding systems are forced to choose one mode of interpolation (field-based or frame-based) off line and are pre-programmed to apply only that mode of interpolation blindly to all the frame motion compensation blocks.

Contrary to existing decoding systems, a motion compensation predictor of a decoding system of the present invention can be adapted to dynamically in real time determine a likely local nature of reference frame data area in the video data stream, whether the reference frame is in reduced resolution or not. This can also include utilizing a vertical component of a decoded motion vector to attempt to determine the likely local nature of the reference frame data area in the video data stream. As a decoding system of the present invention can be for proper interpolation for reduced resolution motion compensation, this can also include utilizing a vertical component of a motion vector to determine a likely local nature of a reduced resolution reference frame data area in the video data stream. Again contrary to existing decoding systems, a motion compensation predictor of the present invention can be adapted to dynamically in real time apply proper interpolation (frame-based interpolation or field-based interpolation) to the reference frame data area according to the determined likely local nature of the reference frame data area. As a decoding system of the present invention can be for proper interpolation for reduced resolution motion compensation, this can also include applying frame-based interpolation or field-based interpolation to the reduced resolution reference frame data area according to the determined likely local nature of the reduced resolution reference frame data area if the video data stream was encoded using frame motion compensation.

For example, if encoding uses frame motion compensation and therefore, a motion compensation predictor of a decoding system of the present invention has the option to use either frame-based or field-based interpolation, and if the motion compensation predictor determines, whether through utilizing the vertical component of a motion vector or not, that the likely local nature of the reference frame data area to be fetched from the interlaced video data stream is likely stationary and not likely to be moving, then the motion compensation predictor can adaptively determine to apply frame-based interpolation. This dynamic determination by the motion compensation predictor avoids applying and developing the problems of blurness and aliasing in the progressive stationary area that would be caused by blindly applying field-based interpolation. Additionally, if the motion compensation predictor is unable to reliably determine, whether through utilizing the vertical component of a motion vector or not, that the likely local nature of the reference frame data area to be fetched from the interlaced video data stream is likely stationary and not likely to be moving, then the motion compensation predictor can be adapted to apply field-based interpolation.

Figure 5:
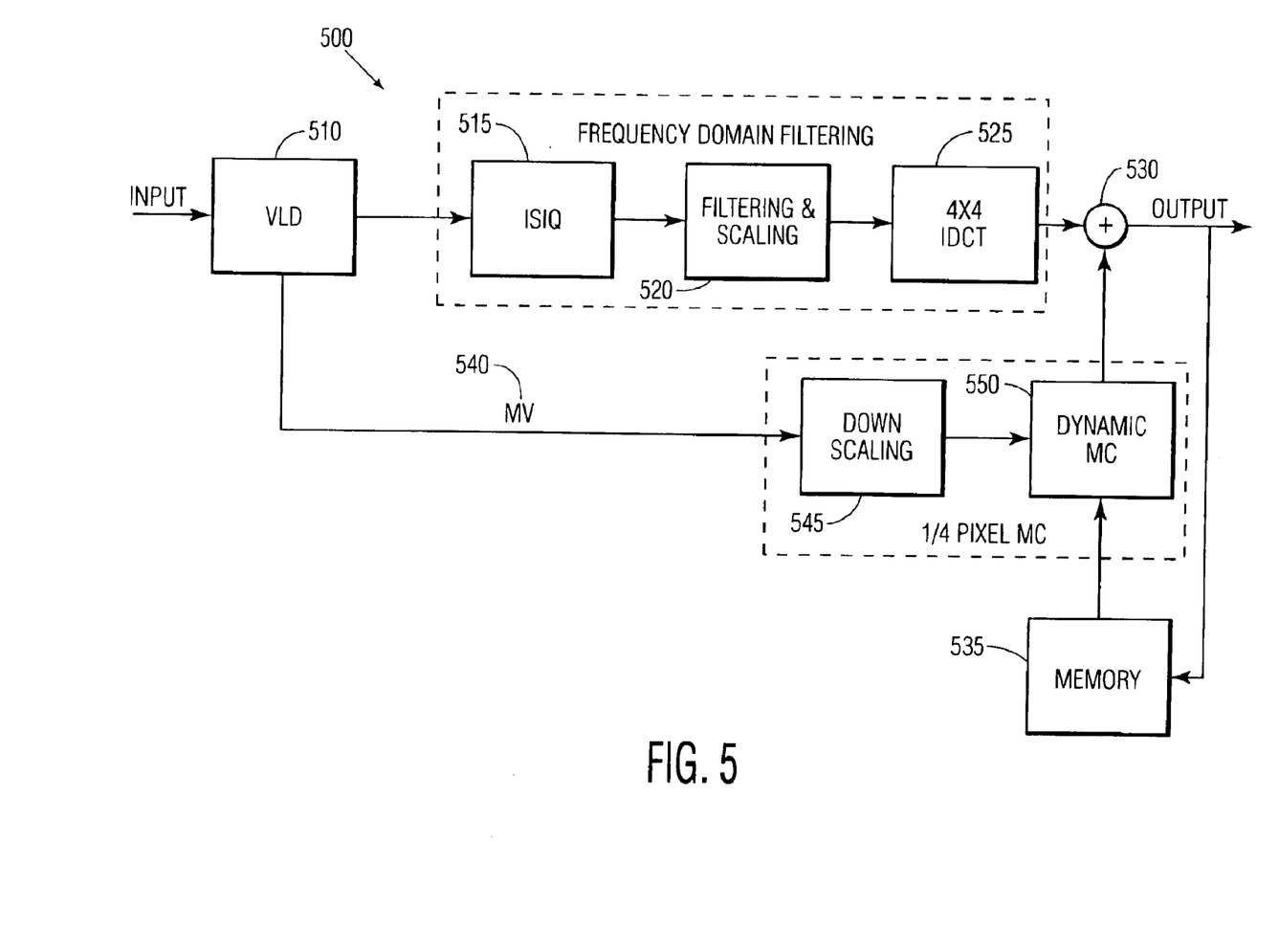
FIG. 5 is a flow diagram depicting a decoding system for proper interpolation for reduced resolution motion compensation according to an embodiment of the present invention.

Referring generally to FIG. 5, a decoding system 500 for applying proper interpolation for reduced resolution motion compensation to a video data stream according to an embodiment of the present invention is depicted. Decoding system 500 can be an MPEG decoding system, such as an MPEG-2 decoding system. Decoding system 500 can include dynamic motion compensation predictor 550 for retrieving reduced resolution reference frame data areas through scaled down motion vectors. Dynamic motion compensation predictor 550 can be adapted to evaluate the video data stream to determine whether the video data stream was encoded using field motion compensation or frame motion compensation. Dynamic motion compensation predictor 550 can also be adapted to then apply field-based interpolation to the video data stream if the video data stream was encoded using field motion compensation. Dynamic motion compensation predictor 550 can also be adapted to determine a likely local nature of a reference frame data area in the video data stream, which can be done by dynamic motion compensation predictor 550 utilizing a vertical component of a motion vector to attempt to determine the likely local nature of the reference frame data area and which can be done dynamically in real time. Dynamic motion compensation predictor 550 can also be adapted to then apply frame-based interpolation or field-based interpolation to the reference frame data area according to the determined likely local nature of the reference frame data area, which can be done dynamically in real time as well. These last two possible adaptations of dynamic motion compensation predictor 550 can be conditional on the video data stream being encoded using frame motion compensation.

More specifically referring to FIG. 5, the following description of decoding system 500 uses a decimation/scaling factor of 2 in the horizontal and vertical dimensions, but the present invention is not limited to factors of 2. Various decimation factors may be used in the present invention, such as 4 or 8 for example. As depicted in FIG. 5, decoding system 500 can include components as generally described previously in the Overview section as well as other additional components, but the components are arranged and adapted to carry out the present invention. Thus, decoding system 500 can include an embedded resizing decoding loop that includes variable length decoder (VLD) 510, inverse scan inverse quantization (ISIQ) device 515, frequency domain filtering and scaling device 520, and inverse discrete cosine transfer (IDCT) device 525. Decoding system 500 can also include adder 530, memory device 535, down scaling device 545, and dynamic motion compensation (MC) predictor 550.

The decoding loop of decoding system 500 in FIG. 5 is arranged to process an inputted interlaced digital video data stream so as to realize a reduction in the size of memory 535 and a reduction in the computational complexity of IDCT device 525. Specifically, the digital video data stream is inputted into VLD 510, wherein VLD 510 extracts data from the digital video data stream. VLD 510 is capable of performing variable length decoding, inverse run length decoding, and inverse DPCM coding as appropriate. The transmitted DCT coefficients representing the spatial frequency spectra of image areas are then passed through ISIQ device 515 to inverse quantize the respective DCT coefficients and to convert the coefficients to a matrix of pixel data. DCT coefficients are then filtered and decimated/downscaled before IDCT device 425 by filtering and scaling device 520. Filtering and scaling in the frequency domain results in reduced size (4 by 4) IDCT 525. From filtering and scaling device 520, IDCT device 525 is supplied with 4 by 4 matrices of coefficients derived from the 8 by 8 matrices of transmitted coefficients. IDCT 525 is arranged to calculate 4 by 4 matrices of output values from the 4 by 4 matrices of input coefficients. This translates into a significant hardware savings in IDCT device 525 as well as lowering the requisite speed of operation of IDCT device 525. IDCT device 525 then provides downscaled blocks of pixel values (output) to a first input of adder 530. Eventually, as explained more fully below, adder 530 generates reconstructed reference frames (used as anchors for prediction of subsequent frames) and stores them in memory device 535 in the reduced resolution.

Thus, one advantage of utilizing the present invention with decoding system 500 of FIG. 5 is that decoding system 500 has SD resolution frame memory, SD resolution decoding complexity, and no spatial domain filtering. Specifically, in decoding system 500 of FIG. 5, resizing with frequency domain filtering and scaling device 520 is embedded in the decoding loop to save both memory and computation. In other words, it is desirable that IDCT device 525 work at reduced size (4×4) and directly output data blocks in reduced size. Therefore, both DCT block filtering and downscaling are done by frequency domain filtering and scaling device 520 before IDCT device 525 in order to save more computation. This saving from low resolution IDCT outweighs the extra computation needed to filter and downscale the DCT coefficients.

Again referring to FIG. 5, decoded motion vectors 540 from VLD 510 correspond to the original size full resolution picture (i.e., outputted motion vectors 540 are full resolution motion vectors that are either pixel (integer) positions or ½ pixel positions) and need to be down scaled to fit in reduced resolution reference frames. In other words, in order to maintain the spatial (pixel) position accuracy, motion vectors 540 are scaled down (rather than truncated) from their original half pixel precision to quarter pixel precision by down scaling device 545, thereby requiring quarter pixel precision motion compensation.

In accordance with the present invention, dynamic motion compensation predictor 550 can evaluate the video data stream dynamically in real time to determine motion compensation used by encoding. If encoding used field motion compensation, dynamic motion compensation predictor 550 applies field-based interpolation. However, providing the encoding process used frame motion compensation, dynamic motion compensation predictor 550 has the option to apply either frame-based or field-based interpolation. Dynamic motion compensation predictor 550 can then utilize dynamically in real time the vertical components of full resolution motion vectors 540 (that have now been scaled down to fit in the reduced resolution) to attempt to determine the likely local natures of data areas of reduced resolution reference frames stored in memory device 535. Then, dynamic motion compensation predictor 550 can apply dynamically in real time proper interpolation (field-based interpolation or frame-based interpolation) according to the determined likely local natures of the reduced resolution reference frame data areas. Once dynamic motion compensation predictor 550 retrieves reduced resolution reference frame data areas through scaled down motion vectors 540 from the reduced resolution reference frames stored in memory device 535, dynamic motion compensation predictor 550 applies the fetched reduced resolution reference frame data areas (output) to a second input of adder 530. Adder 530 then sums up the outputs of IDCT device 525 and dynamic motion compensation predictor 550 to reconstruct the frame. Once reconstructed, there are two paths for the reconstructed reduced resolution reference frame generated by adder 530: one path directly for output and one path to memory device 535 that is coupled to dynamic motion compensation predictor 550.

Thus, another advantage of utilizing the present invention with decoding system 500 of FIG. 5 is that Dynamic motion compensation predictor 550 of decoding system 500 can dynamically in real time: evaluate a video data stream to determine motion compensation used by encoding process; utilize vertical components of motion vectors 540 in full resolution to attempt to determine the likely local natures of the reduced resolution reference frame data areas; and apply proper interpolation according to the determined likely local natures of the reduced resolution reference frame data areas provided the encoding process uses frame motion compensation. This results in better output video quality, thereby eliminating problems such as blackness, blurring, aliasing, and a generally degraded picture, as opposed to existing decoding systems that choose only one mode of interpolation (field-based or frame-based) off line and apply it blindly to all the frame motion compensation blocks.

While the invention has been particularly shown and described with reference to embodiments thereof, it will be understood by those skilled in the art that various changes in form and details may be made therein without departing from the spirit and scope of the invention. Accordingly, unless otherwise specified, any components of the decoding system according to the present invention indicated in the drawings or herein are given as an example of possible components and not as a limitation. Similarly, unless otherwise specified, any steps or sequence of steps of the method indicated in the drawings or herein are given as an example of possible steps and a possible sequence of steps, and not as limitations.

What is claimed is:

1. A method for applying proper interpolation for motion compensation in a video data stream, the method comprising the steps of:
   determining a likely local nature of a reference frame data area in the video data stream and applying proper interpolation to the reference frame data area according to the determined likely local nature of the reference frame data area; and
   evaluating the video data stream to determine whether the video data stream was encoded using field motion compensation or frame motion compensation;
   wherein determining of the likely local nature of the reference frame data area in the video data stream further comprises utilizing a vertical component of a motion vector to attempt to determine the likely local nature of the reference frame data area in the video data stream.

2. The method of claim 1 further comprising the step of applying field-based interpolation to the video data stream if the video data stream was encoded using field motion compensation.

3. The method of claim 1, wherein the stop of evaluating the video data stream to determine whether the video data stream was encoded using fold motion compensation or frame motion compensation results in a determination that the video data stream was encoded using frame motion compensation and that encoding determined for decoding to fetch the reference frame data area starting from a pixel position, wherein the step of determining a likely local nature of a reference frame data area in the video data stream that the likely local nature of the reference frame data area comprises a stationary area, and wherein the step of applying proper interpolation to the reference frame data area according to the determined likely local nature of the reference flame data area comprises applying frame-based interpolation to the reference frame data area.

4. The method of claim 1 wherein the step of evaluating the video data stream to determine whether the video data steam was encoded using field motion compensation or frame motion compensation results in a determination that the video data stream was encoded using frame motion compensation and that encoding determined for decoding to fetch the reference frame data area starting from a non-pixel position, wherein the step of determining a likely local nature of a reference frame data area in the video data stream results in a determination that the likely local nature or the reference frame data area in the video data stream likely comprises a stationary area, and wherein the step of applying proper interpolation to the reference frame data area according to the determined likely local nature of the reference frame data area comprises applying frame-based interpolation to the reference framed data area.

5. The method of claim 1, wherein the step of evaluating the video data stream to determine whether the video data stream was encoded using field motion compensation or frame motion compensation results in a determination that the video data stream was encoded using frame motion compensation and that encoding determined for decoding to fetch the reference frame data area starting from a pixel position, wherein the step of determining a likely local nature of a reference frame data area in the video data stream is that the likely local nature of the reference frame data area comprises a stationary area, and wherein the step of applying proper interpolation to the reference frame data area according to the determined likely local nature of the reference frame data area comprises applying field-based interpolation to the reference frame data area.

6. The method of claim 1, wherein the step of determining a likely local nature of a reference frame data area in the video data stream results in a determination that the local nature of the reference frame data area in the video data stream likely comprises a stationary area, and wherein the step of applying proper interpolation to the reference from data area comprises applying frame-based interpolation to the reference frame data area.

7. The method of claim 1, wherein the step of determining a likely local nature of a reference frame data area in the video data stream is that the local nature of the reference frame data area likely comprises a stationary area, and wherein the step of applying proper interpolation to the reference frame data area according to the determined likely local nature of the reference frame data area comprises applying field-based interpolation to the reference frame data area.

8. The method of claim 1, wherein the step of determining a likely local nature of a reference frame data area in the video data stream comprises determining dynamically in real time a likely local nature of a reference frame data area in the video data stream.

9. The method of claim 1, wherein the step of applying proper interpolation to the reference frame data area according to the determined likely local nature of the reference frame data area comprises applying dynamically in real time proper interpolation to the reference frame data area according to the determined likely local nature of the reference frame data area.

10. The method of claim 1, wherein the method is for applying proper interpolation for reduced resolution motion compensation in the video data stream.

11. A method for applying proper interpolation for reduced resolution motion compensation in a video data stream, the method comprising the steps of:
evaluating the video data stream to determine whether the video data stream was encoded using field motion compensation or frame motion compensation;
applying field-based interpolation to the video data stream if the video data stream was encoded using field motion compensation;
utilizing a vertical component of a motion vector to determine a likely local nature of a reduced resolution reference frame data area in the video data stream; and
applying frame-based interpolation or field-based interpolation to the reduced resolution reference frame data area according to the determined likely local nature of the reduced resolution reference frame data area if the video data stream was encoded using frame motion compensation.

12. The method of claim 11, wherein the step of evaluating the video data stream to determine whether the video data stream was encoded using field motion compensation or frame motion compensation results in a determination that the video data stream was encoded using frame motion compensation and that encoding determined for decoding to fetch the reduced resolution reference frame data area starting from a pixel position, wherein the step of utilizing a vertical component of a motion vector to determine a likely local nature of a reduced resolution reference frame data area in the video data stream is that the likely local nature of the reduced resolution reference frame data area comprises a stationary area, and wherein the step of applying frame-based interpolation or field-based interpolation to the reduced resolution reference frame data area according to the determined likely local nature of the reduced resolution reference frame data area if the video data stream was encoded using frame motion compensation composes applying frame-based interpolation to the reduced resolution reference frame data area.

13. The method of claim 11, wherein the step of evaluating the video data stream to determine whether the video data stream was encoded using field motion compensation or frame motion compensation results in a determination that the video data stream was encoded using frame motion compensation and that encoding determined for decoding to fetch the reduced resolution reference frame data area starting from a non-pixel position, wherein the step of utilizing a vertical component of a motion vector to determine a likely local nature of a reduced resolution reference frame data area in the video data stream results in a determination that the likely local nature of the reduced resolution reference frame data area in the video data stream likely comprises a stationary area, and wherein the step of applying frame-based interpolation or field-based interpolation to the reduced resolution reference frame data area according to the determined likely local nature of the reduced resolution reference frame data area if the video data stream was encoded using frame motion compensation comprises applying frame-based interpolation to the reduced resolution reference frame data area.

14. The method claim 11, wherein the step of evaluating the video data stream to determine whether the video data stream was encoded using field motion compensation or frame motion compensation results in a determination that the video data stream was encoded using frame motion compensation mid that encoding determined for decoding to fetch the reduced resolution reference frame data area staring from a pixel position, wherein the step of utilizing a vertical component of a motion vector to determine a likely local nature of a reduced resolution reference frame data area in the video data stream is unable to reliably determine that the likely local nature of the reduced resolution reference frame data area comprises a stationary area, and wherein the step of applying frame-based interpolation or field-based interpolation to the reduced resolution reference frame data area according to the determined likely local nature of the reduced resolution reference frame data area if the video data stream was encoded using frame motion compensation comprises applying field-based interpolation to the reduced resolution reference frame data area.

15. The method of claim 11, wherein the step of utilizing a vertical component of a motion vector to determine a likely local nature of a reduced resolution reference frame data area in the video data stream results in a determination that the local nature of the reduced resolution reference frame data area in the video data stream likely comprises a stationary area, and wherein the step of applying frame-based interpolation or field-based interpolation to the reduced resolution reference frame data area according to the determined likely local nature of the reduced resolution reference frame data area if the video data stream was encoded using frame motion compensation comprises applying frame-based interpolation to the reduced resolution referenced frame data area.

16. The method of claim 11, wherein the step of utilizing a vertical component of a motion vector to determine a likely local nature of a reduced resolution reference frame data area in the video data stream is that the local nature of the reduced resolution reference frame data area in the video data stream likely comprises a stationary area, and wherein the step of applying frame-based interpolation or field-based interpolation to the reduced resolution reference frame data area according to the determined likely local nature of the reduced resolution reference frame data area if the video data stream was encoded using frame motion compensation comprises applying field-based interpolation to the reduced resolution reference frame data area.

17. The method of claim 11, wherein the step of utilizing a vertical component of a motion vector to determine likely local nature of a reduced resolution reference frame data area in the video data stream comprises utilizing dynamically in real time a vertical component of a motion vector to determine a likely local nature of a reduced resolution reference frame data area in the video data stream.

18. The method of claim 11, wherein the step of applying frame-based interpolation or field-based interpolation to the reduced resolution reference frame data area according to the determined likely local nature of the reduced resolution reference frame data area if the video data steam was encoded using frame motion compensation comprises applying dynamically in real time frame-based interpolation or field-based interpolation to the reduced resolution reference frame data area according to the determined likely local nature of the reduced resolution reference frame data area if the video data stream was encoded using frame motion compensation.

19. A decoding system for applying proper interpolation for motion compensation in a video data stream, wherein the decoding system comprises a motion compensation predictor for retrieving reference frame data areas through motion vectors, and wherein the motion compensation predictor is adapted to: determine a likely local nature of a reference frame data area in the video data stream and apply proper interpolation to the reference frame data area according in the determined likely local store of the reference frame data area, wherein the motion compensation predictor is adapted to utilize a vertical component of a motion vector to attempt to determine a likely local nature of a reference frame data area in the video data stream.

20. The decoding system of claim 19, wherein the motion compensation predictor is adapted to evaluate the video data stream to determine whether the video data stream was encoded using field motion compensation or frame motion compensation.

21. The decoding system of claim 20 wherein the motion compensation predictor is adapted to apply field-based interpolation to the video data stream if the video data stream was encoded using field motion compensation.

22. The decoding system or claim 20, wherein the motion compensation predictor determines that the video data stream was encoded using frame motion compensation and that encoding determined for the motion compensation predicator to fetch the reference frame data area starting from a pixel position, wherein the motion compensation predictor is that the likely local nature of the reference frame data area comprises a stationary area, and wherein the motion compensation predictor applies frame-based interpolation to the reference frame data area.

23. The decoding system of claim 20, wherein the motion compensation predictor determines that the video data stream was encoded using frame motion compensation and that encoding determined for the motion compensation predictor to fetch the reference frame data area starting from a non-pixel position, wherein the motion compensation predictor determines that the likely local nature of the reference frame data area in the video data stream likely comprises a stationary area, and wherein the motion compensation predictor applies frame-based interpolation to the reference frame data area.

24. The decoding system of claim 20, wherein the motion compensation predictor determines that the video data stream was encoded using frame motion compensation and that encoding determined for the motion compensation predictor to fetch the reference frame data area starting from a pixel position, wherein the motion compensation predictor is that the likely local nature of the reference frame data area comprises a stationary area, and wherein the motion compensation predictor applies field-based interpolation to the reference frame data area.

25. The decoding system of claim 19, wherein the motion compensation predictor determines that the local nature of the reference fame data area in the video data stream likely comprises a stationary area, and wherein the motion compensation predictor applies frame-based interpolation to the reference frame data area.

26. The decoding system of claim 19, wherein the motion compensation predictor is that the local nature of the reference frame data area comprise a stationary area, and wherein the motion compensation predictor applies field-based interpolation to the reference frame data area.

27. The decoding system of claim 19, wherein the motion compensation predictor is adapted to dynamically in real time determine a likely local nature of a reference frame data area in the video data stream.

28. The decoding system of claim 19, wherein the motion compensation predictor is adapted to dynamically in real time apply proper interpolation to the reference frame data area according to the determined likely local nature of the reference frame data area.

29. The decoding system of claim 19, wherein the decoding system is for applying proper interpolation for reduced resolution motion compensation in the video data stream, and wherein the motion compensation predictor is for retrieving reduced resolution reference frame data areas through scaled down motion vectors.

30. The decoding system of claim 19, wherein the decoding system comprises an MPEG decoding system.

31. An MPEG decoding system for applying proper interpolation for reduced resolution motion compensation in a video data stream, wherein the decoding system comprises a motion compensation predictor for retrieving reduced resolution reference frame data areas through scaled down unction vectors, and wherein the motion compensation predictor is adapted to: evaluate the video data stream to determine whether the video data stream was encoded using field motion compensation or frame motion compensation; apply field-based interpolation to the video data stream if the video data stream wins encoded using field motion compensation; utilize a vertical component of a motion vector to attempt to determine a likely local nature of reduced resolution reference frame data area in the video data stream; and apply frame-based interpolation or field-based interpolation to the reduced resolution reference frame data area according to the determined likely local and nature of the reduce resolution reference frame data area if the video data stream was encoded using frame motion compensation.

32. The MPEG decoding system of claim 31, wherein the motion compensation predictor determines that the video data stream was encoded using frame motion compensation and that encoding determined for the motion compensation predictor to fetch the reduced resolution reference frame data area starting from a pixel position, wherein the motion compensation predictor is unable to reliably determine that the likely local native of the reduced resolution reference frame data area comprises a stationary area, and wherein the motion compensation predictor applies frame-based interpolation to the reduced resection reference frame data area.

33. The MPEG decoding system of claim 31, wherein the motion compensation predictor determines that the video data stream was encoded using frame motion compensation and that encoding determined for the motion compensation predictor to fetch the reduced resolution reference frame data area staring from a non-pixel-position, and wherein the motion compensation predicator determines that the likely local nature of the reduced resolution reference frame data area in the video data stream likely comprises a stationary area, and wherein the motion compensation predictor applies frame-based interpolation to the reduced resolution reference frame data area.

34. The MPEG decoding system of claim 31, wherein the motion compensation predicator determines that the video data stream was encoded using frame motion compensation and that encoding determined for the motion compensation predictor to fetch the reduced resolution reference frame data area starting from a pixel position, and wherein the motion compensation predictor is unable to reliably determine that the likely local nature of the reduced resection reference frame data area comprises a stationary area, and wherein the motion compensation predictor applies field-based interpolation to the reduced resolution reference frame data area.

35. The MPEG decoding system of claim 31, wherein the motion compensation predictor determines that the local nature of the reduced resolution reference frame data area in the video data stream likely comprises a stationary area, and wherein the motion compensation predictor applies frame-based interpolation to the reduced resolution reference frame data area.

36. The MPEG decoding system of claim 31, wherein the motion compensation predictor is that the local nature of the reduced resolution reference frame data area comprises a stationary area, and wherein the motion compensation predictor applies field-based interpolation to the reduced resolution reference frame data area.

37. The MPEG decoding system of claim 31, wherein the motion compensation predictor comprises a dynamic motion compensation predictor adapted to dynamically in real time utilize a vertical component of a motion vector to attempt to determine a local nature of a reduced resection reference frame data area in the video data stream.

38. The MPEG decoding system of claim 31, further comprising:
   an inverse discrete cosine transfer device for providing reduced resolution blocks of pixel values for use with the reduced resolution reference frame data area in generating reduced resolution reference frames.

39. The MPEG decoding system of claim 31, further comprising:
   a memory device coupled to the motion compensation predictor, the memory device for storing reduced resolution reference frames.

40. The MPEG decoding system of claim 31, further comprising:
   a down scaling device coupled to the motion compensation predictor, the down scaling device providing the scaled down motion vectors for use by the motion compensation predictor in retrieving the reduced resolution reference frame data areas from reduced resolution reference frames.

41. The MPEG decoding system of claim 31, further comprising:
   an adder coupled to the motion compensation predictor, the adder for generating reduced resection reference frames.

42. The MPEG decoding system of claim 31, wherein the motion compensation predictor comprises a dynamic motion compensation predictor adapted to dynamically real time apply frame-based interpolation or field-based interpolation to the reduced resolution reference frame data area according to the determined likely local nature of the reduced resolution reference frame data area if the video data stream was encoded using frame motion compensation.

43. The MPEG decoding system of claim 31, further comprising:
   an inverse discrete cosine transfer device for providing reduced resolution blocks of pixel values for use with the reduced resolution reference frame data area in generating reduced resolution referenced frames;
   a memory device coupled to the dynamic motion compensation predictor, the memory device for storing the reduced resolution reference frames;
   a down scaling device coupled to the dynamic motion compensation predictor, the down scaling device for providing the scaled down motion vectors for use by the dynamic motion compensation predictor in retrieving the reduced resolution reference frame data area from the reduced resolution reference frames stored in the memory device; and an adder coupled through a first input to the inverse discrete cosine transfer device, coupled through a second input to the dynamic motion compensation predictor, and coupled through an output to the memory device, the adder for generating the reduced resolution reference frames from a summation of the reduced resolution blocks of pixel values inputted from the inverse discrete cosine transfer device and the reduced resolution reference frame data areas inputted from the dynamic motion compensation predictor.

* * * * *